United States Patent
Woo et al.

[11] Patent Number: 6,018,415
[45] Date of Patent: Jan. 25, 2000

[54] X-Y TABLE HAVING BELT DRIVES FOR MOVING A STAGE OF THE TABLE IN FINE INCREMENTS AND MICROSCOPE COMPRISING THE SAME

[75] Inventors: Chang-woo Woo, Suwon; Kyue-sang Choi, Seoul; Yeun-kyoung Shin; Jae-young Woo, both of Suwon, all of Rep. of Korea

[73] Assignee: Samsung Electronics Co., Ltd., Suwon, Rep. of Korea

[21] Appl. No.: 09/144,543

[22] Filed: Aug. 31, 1998

[30] Foreign Application Priority Data

Oct. 23, 1997 [KR] Rep. of Korea ................. 97-54552
Jun. 9, 1998 [KR] Rep. of Korea ................. 98-21373

[51] Int. Cl.[7] .................. G02B 21/26; F16H 19/06; G05G 11/00
[52] U.S. Cl. ............. 359/393; 74/490.13; 74/89.22; 248/661; 248/178.1; 414/749
[58] Field of Search ............... 359/393; 74/490.13, 74/89.22; 248/661, 178.1; 414/749; 192/89.2

[56] References Cited

U.S. PATENT DOCUMENTS 4,753,119  6/1988  Kuspert ........................ 74/89.21
5,731,708  3/1998  Sobhani ........................ 324/758
5,802,925  9/1998  Kanao ........................... 359/353

*Primary Examiner*—Jon Henry
*Attorney, Agent, or Firm*—Jones Volentine, LLP

[57] ABSTRACT

An X-Y table of a microscope includes an a X-axis moving plate, an object holder mounted on an upper surface of the X-axis moving plate, a Y-axis moving plate to which the X-axis moving plate is slidingly coupled for movement in the X direction, a fixed plate to which the Y-axis moving plate is slidingly coupled for movement in the Y direction, an X-axis driving system which uses a belt for moving the X-axis moving plate in the X direction, and Y-axis driving system which also uses a belt for moving the Y-axis moving plate in the Y direction. The X-axis moving plate and the Y-axis moving plate serve as the stage of the microscope. In operation, when it is desired to move the X- and Y-moving plates rapidly to generally position the object under the microscope, the belts of the X- and Y-driving systems are disengaged from drive elements associated therewith. Without the belts being engaged, the X and Y plates can thus travel quickly and smoothly and, without abrasion occurring between the belts and their associated drive elements. On the other hand, when the X- and Y-moving plates are to be moved in fine uniform increments to precisely position the object held by the object holder, the belts are engaged and are used to move the plates slowly to precisely position the object under the microscope.

19 Claims, 8 Drawing Sheets

X-Y TABLE HAVING BELT DRIVES FOR MOVING A STAGE OF THE TABLE IN FINE INCREMENTS AND MICROSCOPE COMPRISING THE SAME

BACKGROUND OF THE INVENTION

1. Field of the Invention

The present invention relates to an X-Y table. More particularly, the present invention relates to a belt drive system of a stage of the X-Y table, which produces few particles when used, and thus is particularly useful in a facility in which a clean environment is required.

2. Description of the Related Art

Generally speaking, microscopes are widely used in many fields to produce enlarged images of objects under study. Various kinds of microscopes are in fact employed in the field of semiconductor device fabrication to examine the fine wiring pattern that is often formed on the surface of a semiconductor wafer.

The fabrication of semiconductor devices involves highly precise processing steps. Wafers that do not meet certain threshold standards or which are inferiorly-manufactured are discarded to prevent the malfunctioning of the devices into which the wafers are to be incorporated. Otherwise, the yield of such devices would be low.

Therefore, various kinds of tests and analyses are performed on the wafers between the processing runs or within the course of one processing run. Among these tests, those for detecting contamination or a malfunction of the wafer are especially important in achieving a high yield of end products.

Such contamination or manufacturing defect can be directly detected by an operator, and the degree to which the wafer is contaminated or flawed can be observed using a microscope. To this end, the wafers in a production line are first examined with the naked eye. First, the operator removes the wafer from a cassette with a pair of vacuum tweezers, and loads the wafer onto a boat where it is held under suction. Then the operator illuminates the wafer. Even very small particles or dust can be detected this way by shining white light or monochromatic light of a short wavelength on the wafer at a certain angle. That is, light reflected at that angle from the particles or dust exposes the presence of the same rather clearly.

Contamination of or defects in the wafer, which are not capable of being detected by the above method, are checked for by using a metal microscope or an electron microscope.

Figure 1:
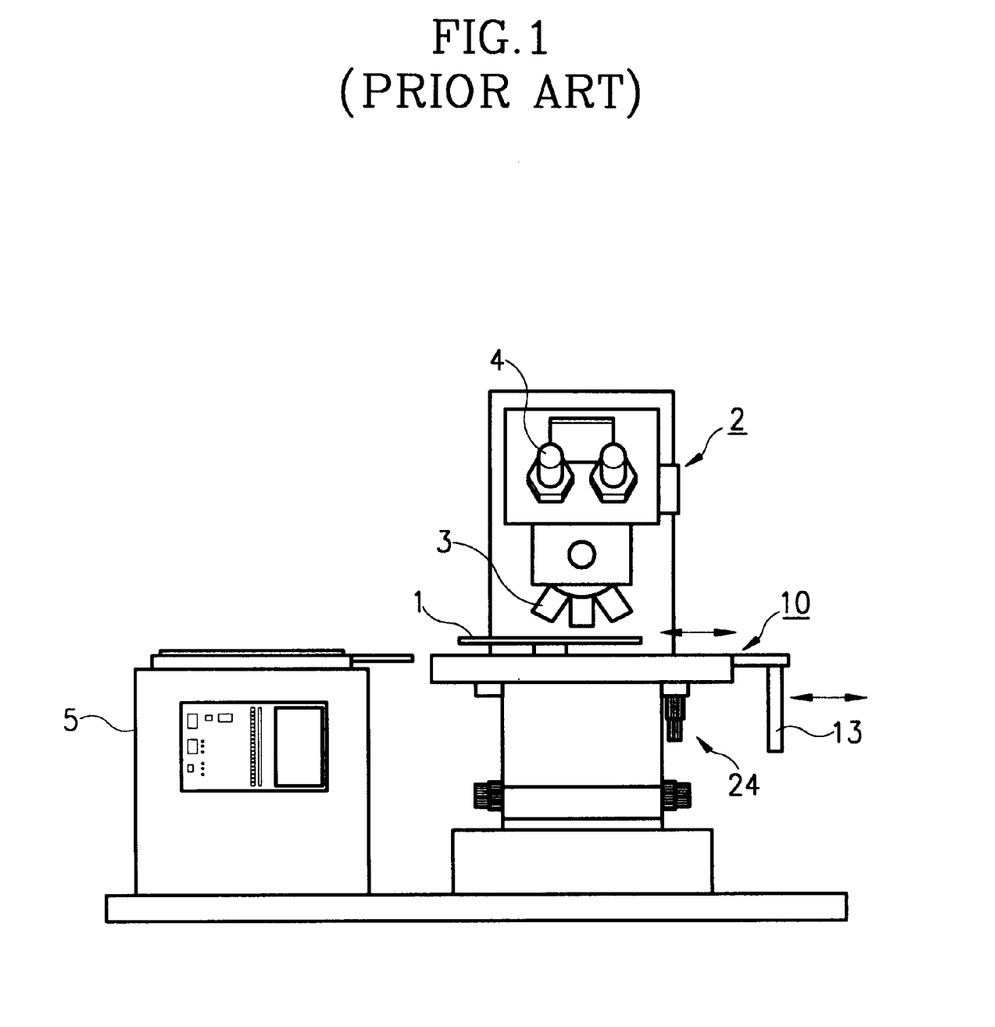
FIG. 1 is a front view of a conventional microscope having an X-Y table for a stage.

FIG. 1 shows a conventional apparatus for inspecting wafers. In this apparatus, the wafer 1 is provided on an auto-loader 5, which can adjust the angle at which the wafer is held in order to provide the appropriate angle of reflection when the wafer is illuminated during the course of its visual inspection. If the wafer passes the inspection, the auto-loader 5 automatically moves the wafer to a microscope 2 so that the wafer 1 can be examined in more detail. In this respect, the microscope 2 has a pair of ocular lenses 4 and a set of objective lenses 3 for producing an enlarged image of the wafer 1.

The microscope 2 has an X-Y table 10 comprising a stage disposed beneath the objective lenses 3 of the microscope 2. The wafer 1 is secured on the stage by suction. The stage also allows the wafer 1 to be moved left and right and back and forth along X and Y axes perpendicular to one another so that the entire surface of the wafer 1 can be examined under the microscope 2.

Figure 2:
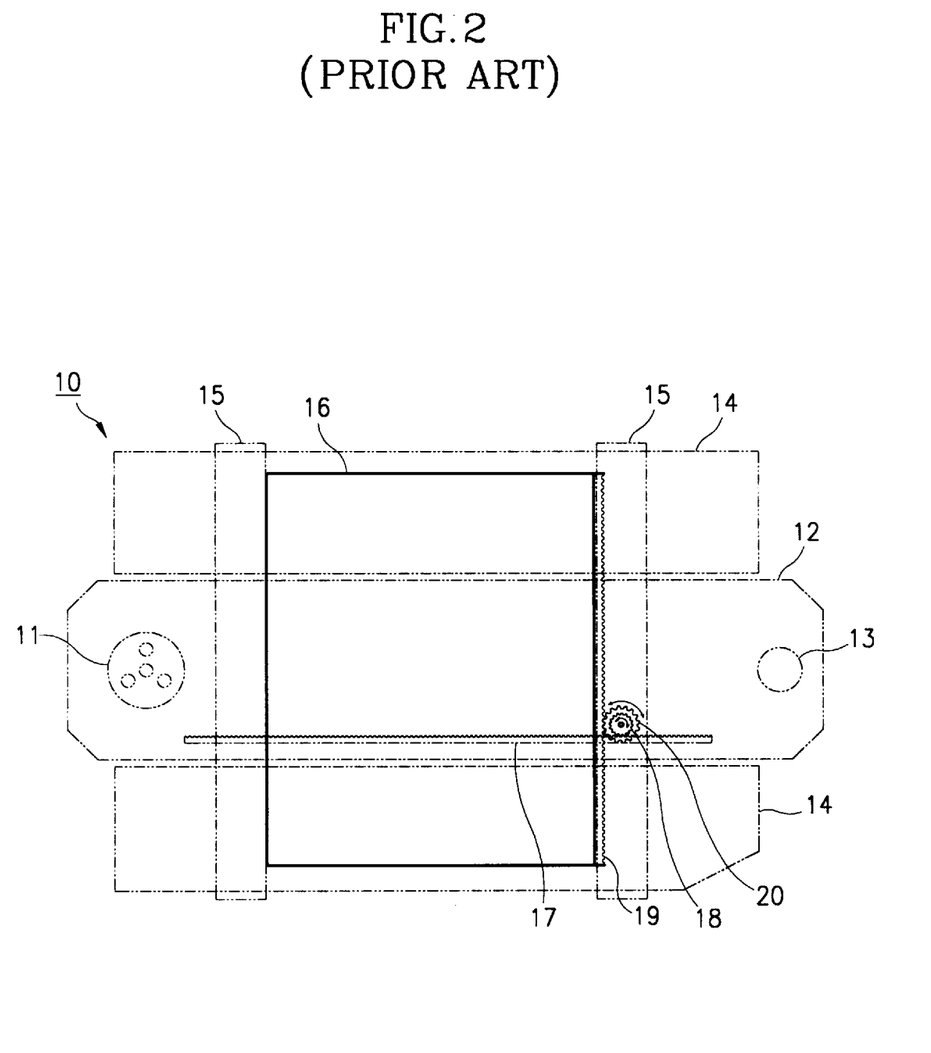
FIG. 2 is a plan view of the conventional X-Y table.
Figure 3:
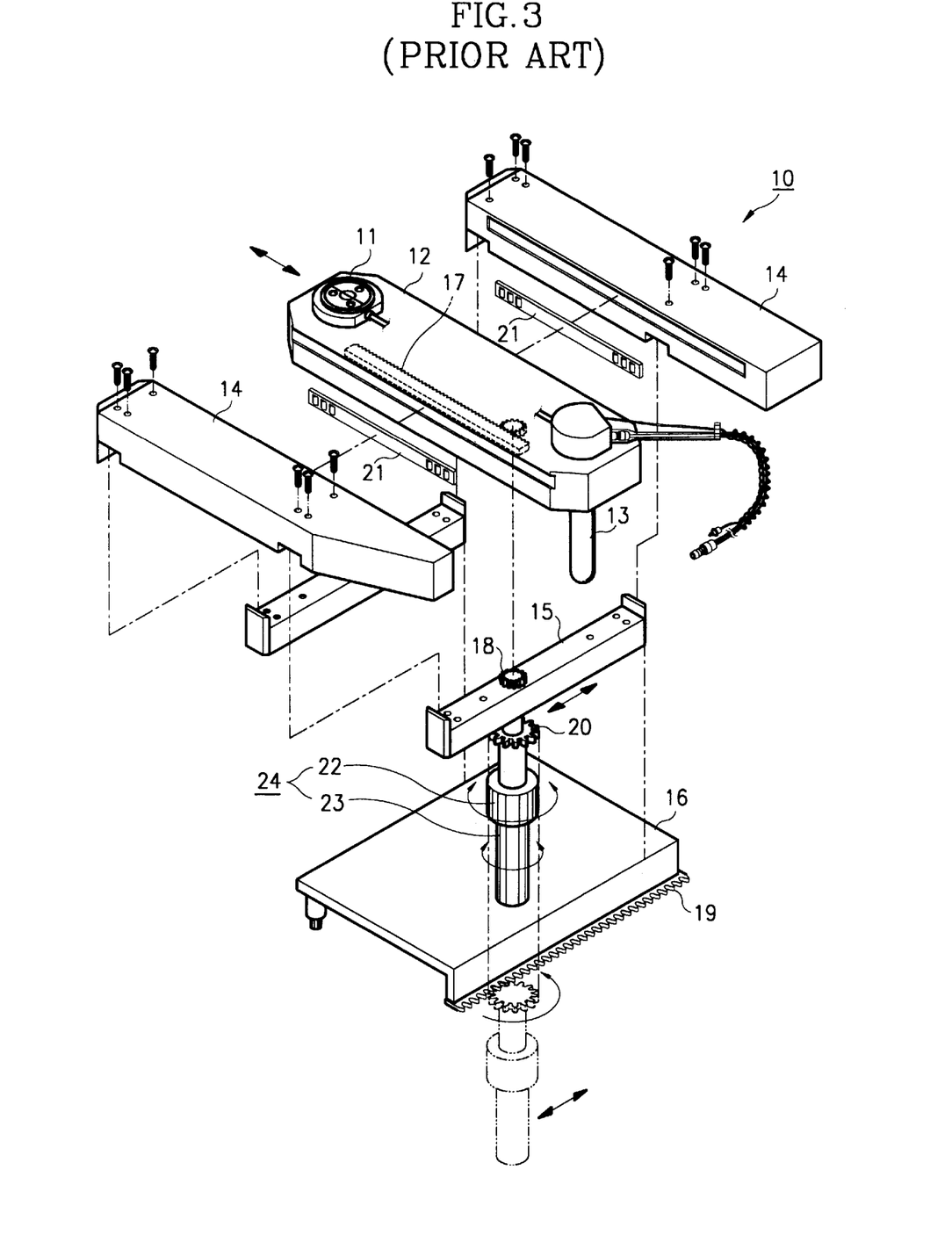
FIG. 3 is an exploded perspective view of the conventional X-Y table.

The conventional X-Y table 10, as shown in FIG. 2 and FIG. 3, comprises: a wafer holder 11 which is rotatable and produces a vacuum to chuck the wafer transferred to the microscope 2 from the auto-loader 5; an X-axis moving plate 12 which is movable in the direction of the X-axis and has the wafer holder 11 mounted to its upper surface; a Y-axis moving plate 14 made up of two members disposed on opposite sides of the X-axis moving plate 12, and connecting rods 15 connecting the members together; a respective bearing 21 interposed between the X-axis moving plate 12 and each of the members of the Y-axis moving plate; and a fixed plate 16 which is fitted between the connecting rods 15, and supports the X-axis moving plate 12 and the connected members of the Y-axis moving plate 14. The Y-axis moving plate 14 and the bearings 21 guide the X-axis moving plate 12 for movement in the direction of the X-axis. On the other hand, the fixed plate 16 guides the Y-axis moving plate 14, along with the X-axis moving is plate 12 sandwiched between the connected members thereof, in the direction of the Y-axis. Specifically, the fixed plate 16 guides the connecting rods 15 of the Y-axis moving plate 14.

In addition, a joy stick 13 projects from one end of the X-axis moving plate 12. An operator can manipulate the joystick 13 to push and pull the X-axis moving plate 12 back and forth and to the right and left to quickly position the wafer 1. A double-control knob 24 extends through one of the connecting rods 15 of the Y-axis moving plate 14. The double-control knob 24 is used for moving the wafer 1 in fine increments along the X-axis and the Y-axis.

The double-control knob 24 includes an X-axis control knob 22 and a Y-axis control knob 23 integrated with an X-axis pinion 18 and a Y-axis pinion 20, respectively. An X-axis rack 17 fixed to the X-axis moving plate 12 meshes with the X-axis pinion 18. A Y-axis rack 19 integral with the fixed plate 16 meshes with the Y-axis pinion 20.

Therefore, rotating the X-axis control knob 22 and the Y-axis control knob 23 of the double control knob 24 moves the stage slowly in the direction of the X-axis and in the direction of the Y-axis, respectively. The gearing causes the wafer to move in fine increments along the X and Y axes.

However, the racks 17, 19 and pinions 18, 20 are meshing even during the relatively high-speed movement of the stage allowed for by the joystick 13. Accordingly, the gearing abrades, generating particles which often contaminate and thus adversely affect the wafer. Furthermore, under the heavy load of moving the stage frequently, the gearing becomes severely worn especially at the center portions of the racks. The increases in clearances between the racks 17, 19 and pinions 18, 20 as the result of such localized wear gives rise to a so-called "backlash phenomenon". The life of the machine components (gear elements) is shortened by the vibrations generated by the backlash.

In addition, if the fixed plate is not horizontal, the stage is inclined and the X-axis moving plate and the Y-axis slide downward along the incline when the joystick is released. Accordingly, it is difficult to focus the image when taking a photograph of the object.

Further, because the pressure applied by a rack to the pinion meshing therewith is concentrated locally on the pinion, the diameter of the pinion varies among the portions thereof meshing with different portions of the rack. As a result, rotating a knob of the double control knob over equal increments moves the wafer on the stage over non-uniform increments.

Finally, the physical engagement of the racks and pinions limits the speed at which the stage can be moved with the joystick.

SUMMARY OF THE INVENTION

An object of the present invention is to overcome one or more of the problems, limitations and disadvantages of the prior art.

A specific object of the present invention, therefore, is to provide an X-Y table in which relatively few particles and vibrations are produced, in which the stage of the table can be moved over uniform increments, and which is durable.

Another object of the present invention is to provide an X-Y table which is particularly useful for supporting an object for its examination under a microscope and/or while its photograph is being taken. More specifically, another object of the present invention is to provide an X-Y table having a stage which can be moved easily at a high speed, which can also be moved in fine increments at a low speed, and which will not move after being stopped.

To achieve these objects, the present invention provides an X-Y table having an a X-axis moving plate, an object holder mounted on an upper surface of the X-axis moving plate, a Y-axis moving plate to which the X-axis moving plate is slidingly coupled for movement in the X direction, a fixed plate to which the Y-axis moving plate is slidingly coupled for movement in the Y direction, an X-axis driving system which uses a belt for moving the X-axis moving plate in the X direction, and a Y-axis driving system which also uses a belt for moving the Y-axis moving plate in the Y direction.

The Y-axis moving plate has two members which are disposed close to and on opposite sides of the X-axis moving plate so as to serve as guides for the X-axis moving plate, and connecting rods extending across the bottom of the X-axis moving plate and connecting the guides together.

The fixed plate is sandwiched between the connecting rods so as to similarly serve as a guide for the Y-axis moving plate.

In addition, the X-axis driving system includes an X-axis driven pulley supported by one of the connecting rods so as to be freely-rotatable, an X-axis drive pulley supported by the Y-axis moving plate so as to be freely rotatable (the X-axis belt being wrapped around the X-axis drive pulley and the X-axis driven pulley), a belt holding means fixed to the X-axis moving plate for selectively coupling and releasing the belt to and from the X-axis moving plate, and an X-axis control knob supported by the Y-axis moving plate so as to be freely rotatable and connected to the X-axis drive pulley so as to rotate the X-axis drive pulley.

The Y-axis driving system also includes two Y-axis driven pulleys supported by the fixed plate so as to be freely rotatable (the Y-axis belt being wrapped around the Y-axis driven pulleys), a belt holding means fixed to the fixed plate for selectively coupling and releasing the belt to and from the fixed plate, a Y-axis drive pulley supported by the Y-axis moving plate so as to be freely rotatable, and tangentially contacting one side of the Y-axis belt, and a Y-axis control knob connected with the Y-axis drive pulley so as to rotate the Y-axis drive pulley.

Each belt holding means includes a belt gripper, and a controller for selectively moving the gripper into and out of engagement with the respective belt. The gripper may comprise a belt case through which the belt extends, a stopper disposed in the case and confronting the belt passing through the belt case, and a resilient member disposed in the belt case and exerting a restoring force on the stopper which urges the stopper towards the belt. The controller, on the other hand, is a wire connected to the stopper.

In operation, when it is desired to move the X- and Y-moving plates rapidly to position the object holder in a general area, the wires of the belt holding means are pulled. Consequently, the stoppers are moved out of engagement with the X and Y belts associated therewith. Without the belts being engaged, the X and Y plates can thus travel quickly and smoothly and, without abrasion occurring between the belts and their associated drive elements.

On the other hand, when the X- and Y-moving plates are to be moved in fine uniform increments to precisely position the object held by the object holder, the wires are released, whereby the resilient members urge the grippers into engagement with the respective belts. Rotating the X-axis control knob in this state drives the X-axis belt in the X direction. The belt pulls the X-axis moving plate along therewith due to the coupling provided by the X-axis belt holding means between the X-axis moving plate and the X-axis belt. Because the Y-axis belt is fixed by being coupled to the fixed plate by the Y-axis belt holding means, rotating the Y-axis control knob causes the Y-axis drive pulley to translate along the fixed Y-axis belt in the Y direction. The Y-axis drive pulley pulls the connecting rod of the Y-axis moving plate along therewith in the Y direction. Little abrasion occurs during such fine movements of the X- and Y-axis moving plates.

BRIEF DESCRIPTION OF THE DRAWINGS

Further objects, features and advantages of the present invention will become apparent from the following detailed description of preferred embodiments thereof made with reference to the accompanying drawings, of which.

DETAILED DESCRIPTION OF THE PREFERRED EMBODIMENTS

Preferred embodiments of the present invention will now be described in detail with reference to the accompanying drawings.

Figure 4:
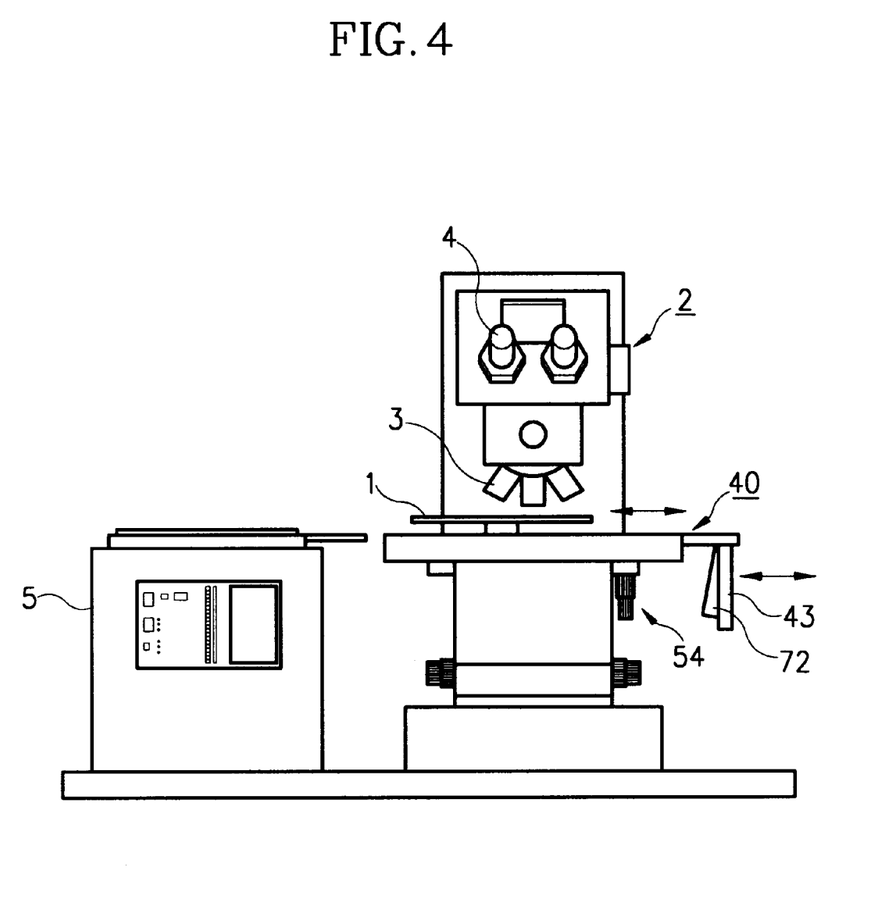
FIG. 4 is a front view of one embodiment of a microscope according to the present invention.

First, referring to FIG. 4, a wafer in an auto-loader 5 is visually examined for apparent defects. The auto-loader 5 can vary the angular position of the wafer to facilitate its visual inspection. If the wafer is found to have a defect, it is moved to a microscope 2 by the auto-loader 5. The microscope 2 has a pair of ocular lenses 4 and a set of objective lenses 3, and is used to observe those details of the defect which could not be seen by the naked eye.

The X-Y table 40 of the present invention is disposed below the set of objective lenses 3 and receives the wafer 1 from the auto-loader 5. The wafer 1 is adhered to the table 40 by suction. The table 40 can move the wafer 1 back and forth and to the right and left, i.e., in X and Y directions perpendicular to one another so that the entire surface of the wafer 1 can be viewed under the microscope 2.

A joy stick 43 is fixed to the stage (described later) of the X-Y table 40 of the present invention. The joy stick 43 includes a trigger 72 which, when pulled, frees the stage for movement in the X-Y directions. Releasing the trigger 72 binds the stage in place. However, even with the stage in such a state, a double control knob 54 can be rotated to move the stage over fine increments in the X-Y directions.

Figure 5:
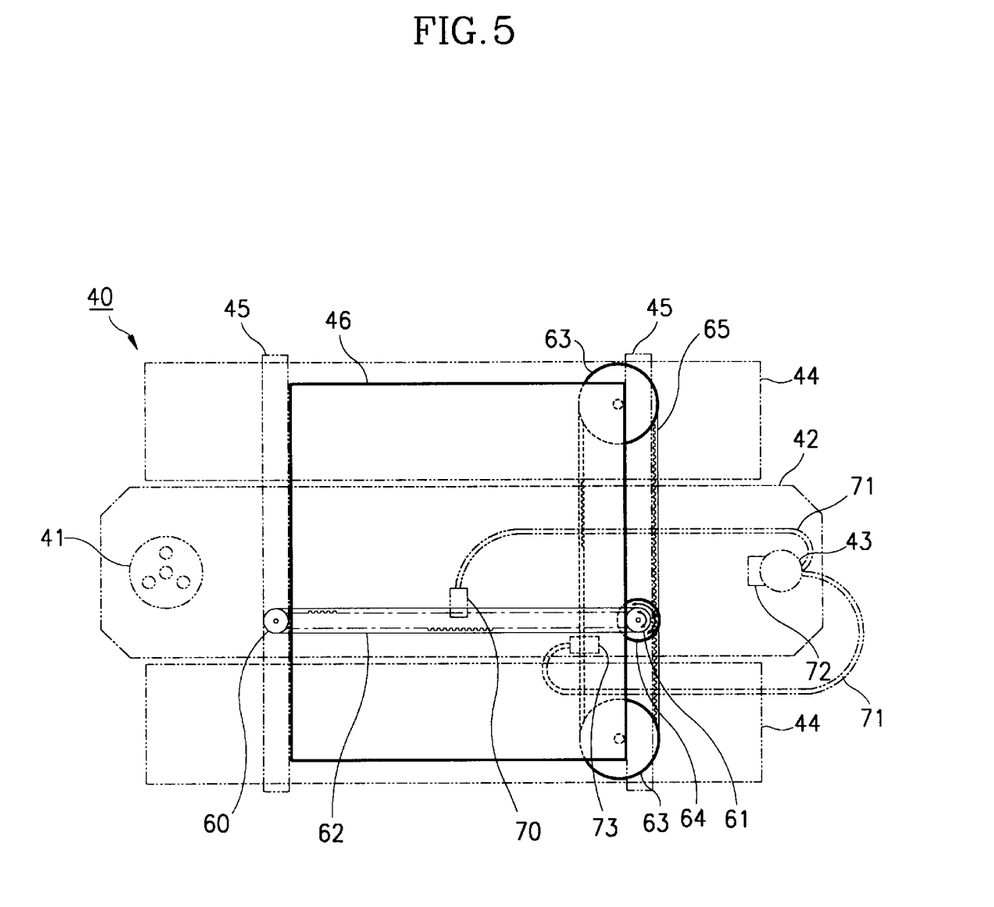
FIG. 5 is a plan view of an X-Y table according to the present invention, comprising the stage of the microscope of FIG. 4.
Figure 6:
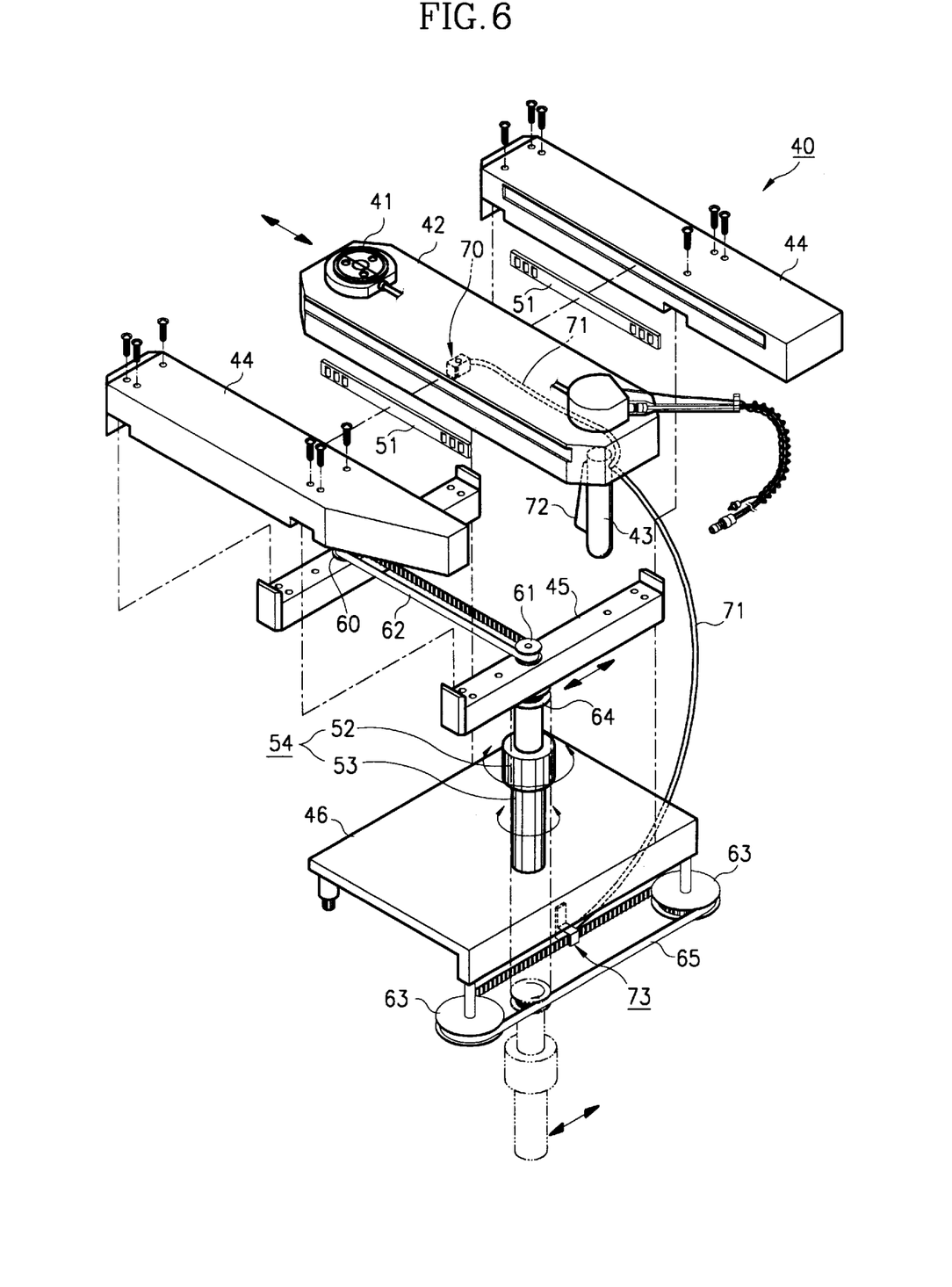
FIG. 6 is an exploded perspective view of the X-Y table according to the present invention.

More specifically, as shown in FIG. 5 and FIG. 6, the stage includes an X-axis moving plate 42 and a Y-axis moving plate 44. A wafer holder 41 is mounted to the upper surface of the X-axis moving plate 42. The Y-axis moving plate 44 supports the X-axis moving plate 42 in a manner which allows the X-axis moving plate 42 to move in the X-axis direction relative to the Y-axis moving plate 44. The Y-axis moving plate 44 is in itself movable in the direction of the Y-axis.

The X-Y table 40 also includes an X-axis driving means, comprising an X-axis belt 62 extending along the X-axis, for moving the X-axis moving plate 42 in the direction of the X-axis; and a Y-axis driving means, comprising a Y-axis belt 65 extending along the Y-axis, for moving the Y-axis moving plate 44 in the direction of the Y-axis.

The Y-axis moving plate 44 comprises two members disposed very close to and on opposite sides of the X-axis moving plate 42, and Y-axis connecting rods 45 extending across the bottom of the members and connecting them together. A fixed plate 46 is received between the connecting rods 45. The two members of the Y-axis moving plate 44 and the X-axis moving plate rest on the fixed plate 46.

The Y-axis moving plate 44 is thus free to slide across the fixed plate 46 in the direction of the Y-axis as guided by the fixed plate 46. Likewise, the X-axis moving plate 42 is free to slide across the fixed plate 46 in the direction of the X-axis as guided by the Y-axis moving plate 44.

Accordingly, a respective linear bearing 51 is interposed between the X-axis moving plate 42 and each member of the Y-axis moving plate 44 in order to reduce the friction therebetween. In addition, bearings (not shown) can be provided between the fixed plate 46 and the Y-axis moving plate 44.

An X-axis driven pulley 60 is supported by the Y-axis moving plate 44 so as to be freely rotatable. An X-axis drive pulley 61 is also supported by the Y-axis moving plate 44 so as to be freely rotatable, and is spaced from the X-axis driven pulley 60 along the X-axis. The X-axis belt 62 is wrapped around the X-axis drive pulley 61 and the X-axis driven pulley 60 so as to transfer the driving force from the X-axis drive pulley 61 to the X-axis driven pulley 60. One side of the belt 62 is selectively held and released by a belt holding means 70 fixed to the X-axis moving plate 42.

The double control knob 54 includes an X-axis control knob 53 and a Y-axis control knob 52. The X-axis control knob 53 extends through one of the Y-axis connecting rods 45 so as to be freely rotatable and is connected to the X-axis drive pulley 61. Thus, when the X-axis control knob 53 is rotated, it in turn rotates the X-axis drive pulley 61. This action moves the X-axis belt 62 between the X-axis driven pulley 60 and the X-axis drive pulley 61. With the belt holding means 70 holding the X-axis belt 62, the X-axis moving plate 42 is thus moved in the direction of the X-axis.

However, if the belt holding means 70 has released the X-axis belt 62, rotating the X-axis control knob 53 will not cause the X-axis moving plate 42 to move.

Two spaced apart Y-axis driven pulleys 63 are supported by the fixed plate 46 so as to be freely rotatable. The Y-axis belt 65 is wrapped around the Y-axis driven pulleys 63. One side of the belt 65 is selectively held and released by a belt holding means 73 fixed to the fixed plate 46. A Y-axis drive pulley 64 is supported so as to be freely rotatable, and contacts one side of the Y-axis belt 65. The Y-axis control knob 52 is connected with the Y-axis drive pulley 64 and thus, can rotate the Y-axis drive pulley 64.

When the Y-axis control knob 52 is rotated, the Y-axis drive pulley 64 65 is rotated. In this case, if the Y-axis belt 65 is held by the belt holding means 73 fixed to the fixed plate 46, the Y-axis belt 65 is fixed so that the Y-axis drive pulley 64 is moved along the fixed belt 65 in the direction of the Y-axis. Accordingly, the Y-axis moving plate 44, which is fixed by the connecting rod 45 to the drive pulley 64, is also moved in the direction of the Y-axis.

However, if the belt holding means 73 has released the Y-axis belt 65, the rotation of the Y-axis control knob 52 will not cause the Y-axis moving plate 44 to move.

Figure 7:
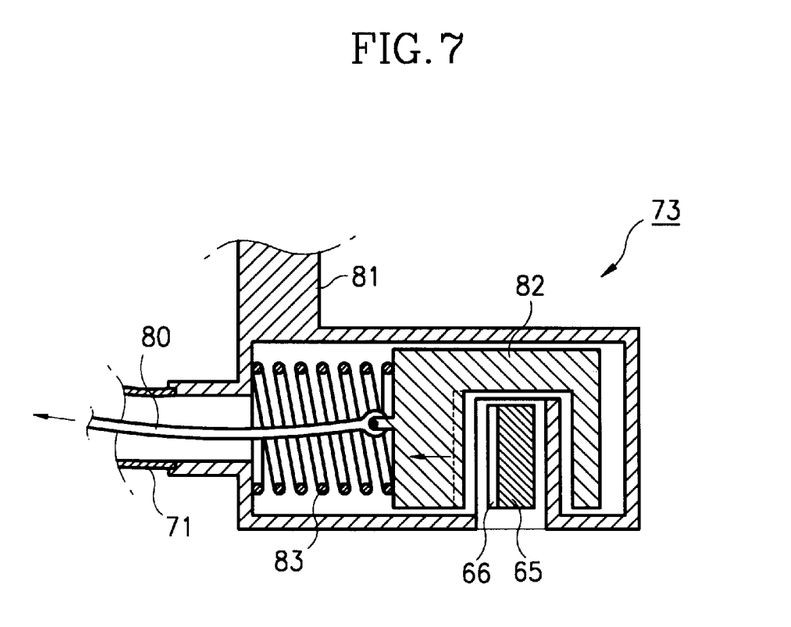
FIG. 7 is a cross-sectional view of a belt holding means of the X-Y table according to the present invention.

FIG. 7 shows the structure of the belt holding means 73 fixed to the fixed plate 46. The belt holding means 70 fixed to the X-axis moving plate 42 has substantially the same structure as that of the belt holding means 73. Accordingly, only the belt holding means 73 will be described in detail for the sake of brevity.

The belt holding means 73 comprises a belt gripper, and a controller for the gripper. The gripper in this case includes a belt case 81 through which the Y-axis belt 65 extends freely, a stopper 82 disposed in the belt case 81, and movable to selectively contact and release one side of the Y-axis belt 65 within the belt case 81, and a coil spring 83 disposed in the belt case 81 and connected to the stopper 82 so as to exert a restoring force on the stopper 82 that urges the stopper 82 towards the belt 65. The stopper 82 can be configured to mesh with the belt 65 when moved into engagement therewith. For example, when the belt 65 is a toothed belt, the stopper 82 has teeth which mesh with the teeth 66 of the belt 65.

The controller, on the other hand, comprises a wire 80 having one end connected to the stopper 82. The wire 80 is used to pull the stopper 82 away from and out of engagement with the belt 65.

Figure 8:
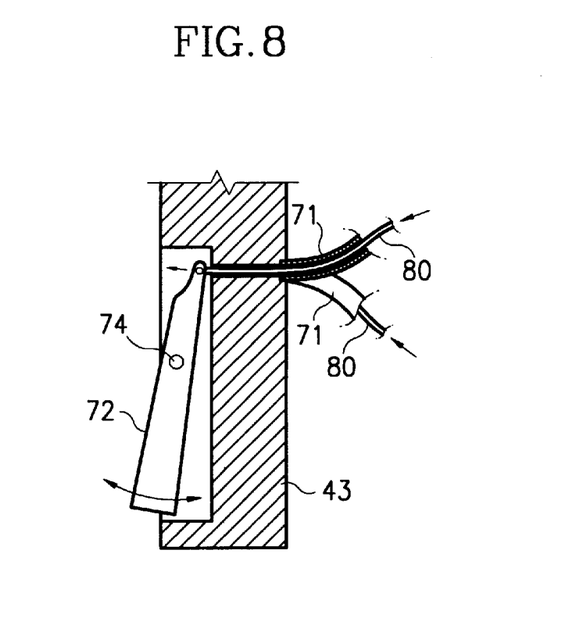
FIG. 8 is a cross-sectional view of a joy stick of the X-Y table according to the present invention.

A tube 71 encloses the wire 80 so as to protect the wire 80, and is made of a flexible material. The trigger 72 is connected with the other end of the wire 80, and is supported for rotation about a support point 74 formed by a pin mounted to the handle of the joystick 43. The action of the trigger pulls the wire 80 to generate tension therein acting against the force of the spring 83.

Therefore, in a normal state (the trigger 72 released), the belt holding means 70,73 grip the X-axis belt 62 and the Y-axis belt 65, respectively. In a control state (the trigger 72 pulled to tension the wire 80), the stoppers 82 of the belt holding means 70,73 are out of engagement with the X-axis belt 62 and the Y-axis belt 65, respectively.

In operation, an operator holds the joy stick 43 protruding from the X-axis moving plate 42. By pulling the trigger 72 while pushing and pulling the joystick 43, the operator can easily move the X-axis moving plate 42 and the Y-axis moving plate 44. Specifically, pulling the trigger 72 again disconnects the belts 62, 65 from the X-axis moving plate 42 and the Y-axis moving plate 44, respectively. In this control state, pushing or pulling the handle of the joystick 43 in the direction of the X axis slides the X-axis moving plate 42 along the X axis as guided by the Y-axis moving plate members between which the X-axis moving plate 42 is fitted. On the other hand, pushing or pulling the handle of the joystick 43 in the direction of the Y axis forces the X-axis moving plate 42 up against either of the members of the Y-axis moving plate. Consequently, the Y-axis moving plate 44 is moved with the X-axis moving plate 42 along the Y-axis, as guided in that direction by the fixed plate 46 sandwiched between the connecting rods 45 of the Y-axis moving plate 44.

Once the stage of the X-Y table 40 is moved by the operator to the position at which the wafer holder 41 is more or less disposed under the objective lens 3 in use, the wafer 1 held by the wafer holder 41 can be precisely positioned under the objective lens by releasing the trigger 72 and using the double control knob 54.

Figure 9:
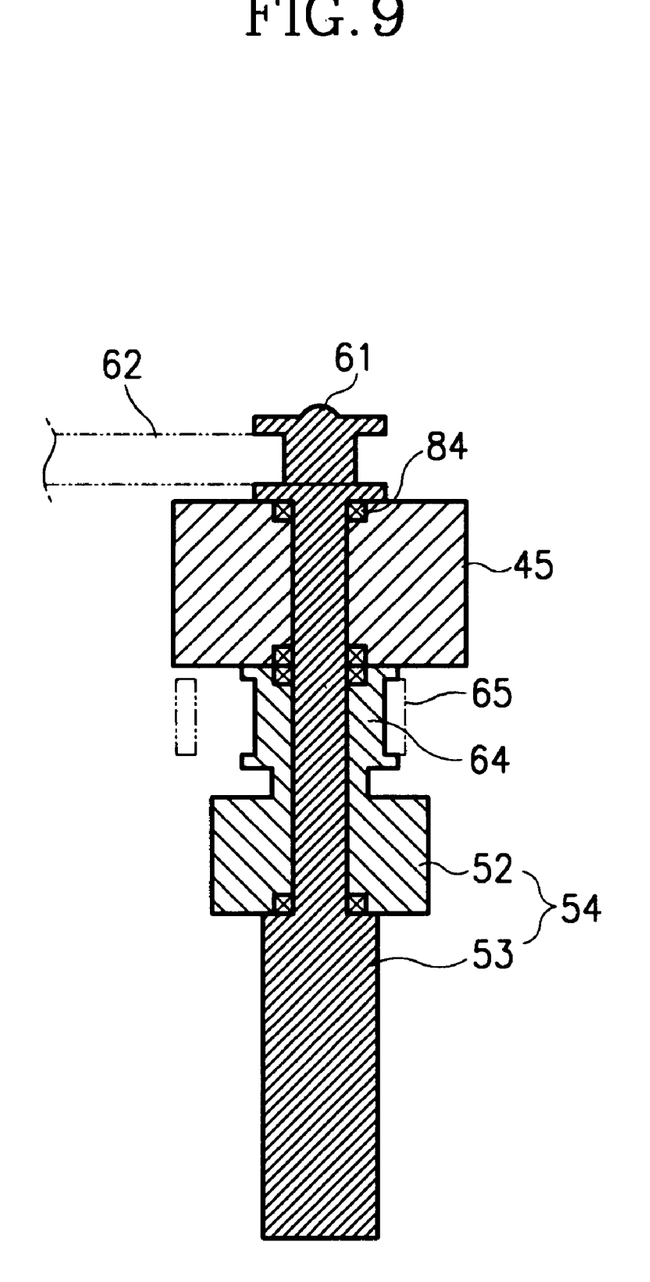
FIG. 9 is a cross-sectional view of a double control knob of the X-Y table according to the present invention.

FIG. 9 shows the structure of the double control knob 54 in detail. The X-axis control knob 53 extends through the Y-axis control knob 52 so that the operator has convenient access to both knobs 52, 53 when precisely moving the wafer 1 along the X-axis or Y-axis. A bearing 84 mounts the double control knob 54 to the connecting rod 45 and allows the X-axis control knob 53 which extends through the connecting rod 45 to rotate freely relative thereto. A bearing similarly mounts the Y-axis control knob 52 to the X-axis control knob 53. Furthermore, the surface of the double control knob 54 is roughened, e.g., is knurled or notched, to allow it to be easily rotated by the operator.

As mentioned above, the wafer holder 41 of the present invention has a suction mechanism which creates a vacuum to secure the wafer 1 to the wafer holder 41. However, the wafer holder 41 can employ other types of chucks. Further, the wafer holder 41 can be rotated in a horizontal plane so that the operator can translate the wafer 1 horizontally by moving the stage and at the same time, can rotate the wafer.

In addition, vibration-damping means (not shown) are provided on the fixed plate 46 to absorb vibrations from the facility which would otherwise be transferred to the wafer. A horizontal control means (not shown) is also provided to maintain the fixed plate 46 level, and thus ensure the horizontal state of the wafer 1.

When the X-axis moving plate 42 and the Y-axis moving plate 44 are moved by the operator at a high speed, i.e. by pulling the trigger 42 and manipulating the handle of the joystick 43, there is no physical engagement of the transmission system, constituted by the belt holding means 70, 73 and the belts 62, 65, and driven by the double control knob 54. Accordingly, there is low wear on the system during such high speed movement, and few particles posing as potential contaminants are produced.

Meanwhile, after a specific chip of the wafer is generally positioned under the objective lens 3 of the microscope 2, it may be necessary to move the wafer in small increments to precisely position the chip in preparation for having a photograph thereof taken or for a close examination thereof. In this case, the operator releases the trigger 72 so that the wires 80 are released, the coil springs 83 push the stoppers 82 of the belt holding means 73 into engagement with the belts 62 and 65, respectively, and the belts 62 and 65 are gripped by the stoppers 82.

As a result, the double control knob 54 now controls the movement of the X-axis moving plate 42 and the Y-axis moving plate 44. That is, when the operator rotates the X-axis control knob 53 and the Y-axis control knob 52, which are connected to the X-axis drive pulley 61 and the Y-axis drive pulley 64, respectively, the X-axis moving plate 42 and the Y-axis moving plate 44 are moved in fine increments precisely corresponding to the degrees to which the control knobs 52 and 53 were rotated.

The use of the double control knob preserves the useful life of the instrument, and prevents the backlash phenomenon which occurs in conventional X-Y tables so that the wafer is prevented from moving during its examination under the microscope or while its photograph is being taken. The diameters of the X-axis and the Y-axis drive pulleys can be selected as desired when the X-Y table is manufactured, to establish the rates and increments at which the control knobs drive the stage. Moreover, the age shapes of the X-axis and the Y-axis belts can also be optimized in consideration of the loads which are to be imposed on the stage.

Although the present invention has been described above in detail, it should be understood that various changes, substitutions and alterations can be made thereto. For example, the belt holding means can comprise various mechanical or electronic elements for holding the belts. Accordingly, all such changes, substitutions and alterations are seen to be within the true spirit and scope of the invention as defined by the appended claims.

What is claimed is:

1. An X-Y table for moving an object in X and Y directions perpendicular to one another, the X-Y table comprising:

a Y-axis moving plate movable in the Y direction, and an X-axis moving plate movable in the X direction and in the Y direction, said X-axis moving plate being slidably fitted to said Y-axis moving plate so as to be carried by the Y-axis moving plate when the Y-axis moving plate moves in the Y direction, and so as to be guided by the Y-axis moving plate for movement relative thereto in the X direction, and said Y-axis moving plate comprising two members each of which is disposed to a respective side of said X-axis moving plate so as to sandwich the X-axis moving plate therebetween, and at least one connecting rod extending across the bottom of said X-axis moving plate and connecting said members together;

an object holder mounted on said X-axis moving plate so as to move therewith;

a fixed plate supporting the Y-axis moving plate, said Y-axis moving plate being slidably fitted to the fixed plate so as to be guided by the fixed plate for movement in the Y direction;

X-axis driving means for driving the X-axis moving plate in the X direction, said X-axis driving means comprising an X-axis belt extending in the X direction; and Y-axis driving means for driving the Y-axis moving plate, and the X-axis moving plate slidably fitted thereto, in the Y direction, said Y-axis driving means comprising a Y-axis belt extending in the Y direction.

2. The X-Y table of claim 1, wherein said object holder is a vacuum chuck, and is mounted to said X-axis moving plate so as to be rotatable relative thereto in a horizontal plane.

3. The X-Y table of claim 1, and further comprising a respective bearing interposed between said X-axis moving plate and each of said members of the Y-axis moving plate.

4. The X-Y table of claim 1, wherein said fixed plate is slidably coupled with said at least one connecting rod of the Y-axis moving plate so as to guide the Y-axis moving plate for movement in the Y direction.

5. The X-Y table of claim 1, wherein said at least one connecting rod comprises a pair of connecting rods extending across the bottom of said X-axis moving plate and connecting said members together, said connecting rods each being disposed to a respective side of said fixed plate so as to sandwich said fixed plate therebetween, and said connecting rods being slidable relative to said fixed plate such that said fixed plate guides the Y-axis moving plate for movement in the Y direction.

6. The X-Y table of claim 1, and further comprising a joystick protruding from said X-axis moving plate, said joystick comprising a handle which can be gripped and manipulated by an operator to move said X-axis moving plate and said Y-axis moving plate directly by hand.

7. The X-Y table of claim 1, and further comprising at least one bearing interposed between said X-axis moving plate and said Y-axis moving plate for facilitating the sliding of said X-axis moving plate relative to said Y-axis moving plate.

8. An X-Y table for moving an object in X and Y directions perpendicular to one another, the X-Y table comprising:

a Y-axis moving plate movable in the Y direction;

an X-axis moving plate movable in the X direction and in the Y direction, said X-axis moving plate being slidably fitted to said Y-axis moving plate so as to be carried by the Y-axis moving plate when the Y-axis moving plate moves in the Y direction, and so as to be guided by the Y-axis moving plate for movement relative thereto in the X direction;

an object holder mounted on said X-axis moving plate so as to move therewith;

a fixed plate supporting the Y-axis moving plate, said Y-axis moving plate being slidably fitted to the fixed plate so as to be guided by the fixed plate for movement in the Y direction;

two Y-axis driven pulleys supported by said fixed plate so as to be freely rotatable and spaced apart in the Y direction;

a Y-axis belt wrapped around the Y-axis driven pulleys;

a Y-axis drive pulley supported by said Y-axis moving plate so as to be freely rotatable and tangentially contacting one side of the Y-axis belt;

a Y-axis control knob connected to said Y-axis drive pulley so as to rotate the Y-axis drive pulley when it is rotated; and belt holding means, mounted to said fixed plate, for selectively coupling and releasing said Y-axis belt to and from said fixed plate such that when said Y-axis belt is coupled by the belt holding means to the fixed plate, rotating the Y-axis control knob causes the Y-axis drive pulley to translate along said one side of the Y-axis belt in the Y direction.

9. The X-Y stage of claim 8, wherein said belt holding means comprises a belt gripper movable into and out of engagement with said Y-axis belt so as to grip the Y-axis belt when moved into engagement therewith and release the Y-axis belt when moved out of engagement therewith, and a controller operatively connected to said gripper so as to selectively move the gripper into and out of engagement with the Y-axis belt.

10. The X-Y table of claim 9, wherein said gripper includes a belt case through which the Y-axis belt extends freely, and a stopper disposed within said belt case and confronting the Y-axis belt, and a resilient member disposed within said belt case and exerting a restoring force on said stopper that urges said stopper towards the Y-axis belt.

11. The X-Y table of claim 10, wherein said resilient member is a coil spring.

12. The X-Y table of claim 10, wherein said controller comprises a wire connected to said stopper, and further comprising a trigger connected to said wire and operable to tension said wire.

13. The X-Y table of claim 12, and further comprising a flexible tube enclosing said wire outside of said belt case so as to protect the wire, and a handle to which said trigger is pivotally supported at its center, said trigger having a free end disposed to one side of its center, and another one end disposed to the other side of its center and connected to said wire, such that when the free end of said trigger is rotated about the center of the trigger, said another end of the trigger pulls said wire to tension the wire.

14. The X-Y table of claim 12, and further comprising a joystick protruding from said X-axis moving plate, said joystick comprising said trigger and a handle which can be gripped and manipulated by an operator to move said X-axis moving plate and said Y-axis moving plate directly by hand, said trigger being mounted to said handle and connected to said wire, such that when said trigger is operated while an operator is gripping the handle of said joystick, said trigger pulls the wire connected thereto against said restoring force to move said stopper out of engagement with the Y-axis belt.

15. The X-Y stage of claim 9, wherein said Y-axis belt is a toothed belt, and said gripper has a surface of a shape complementary to that of the toothed belt.

16. An X-Y table for moving an object in X and Y directions perpendicular to one another, the X-Y table comprising:

a Y-axis moving plate movable in the Y direction;

an X-axis moving plate movable in the X direction and in the Y direction, said X-axis moving plate being slidably fitted to said Y-axis moving plate so as to be carried by the Y-axis moving plate when the Y-axis moving plate moves in the Y direction, and so as to be guided by the Y-axis moving plate for movement relative thereto in the X direction;

an object holder mounted on said X-axis moving plate so as to move therewith;

a fixed plate supporting the Y-axis moving plate, said Y-axis moving plate being slidably fitted to the fixed plate so as to be guided by the fixed plate for movement in the Y direction;

an X-axis driven pulley supported by said Y-axis moving plate so as to be freely rotatable, and an X-axis drive pulley supported by said Y-axis moving plate so as to be freely rotatable and spaced from the X-axis driven pulley in the X direction;

an X-axis belt wrapped around said X-axis drive pulley and said X-axis driven pulley so as to transmit rotation of said X-axis drive pulley to said X-axis driven pulley;

an X-axis control knob having a rotary shaft supported by said Y-axis moving plate so as to be freely rotatable and connected to said X-axis drive pulley so as to rotate the X-axis drive pulley when the X-axis control knob is rotated;

X-axis belt holding means for selectively coupling and releasing said X-axis belt to and from said X-axis moving plate;

two Y-axis driven pulleys supported by said fixed plate so as to be freely rotatable and spaced apart in the Y direction, said Y-axis belt being wrapped around the Y-axis driven pulleys;

a Y-axis drive pulley supported by said Y-axis moving plate so as to be freely rotatable and tangentially contacting one side of the Y-axis belt;

a Y-axis control knob connected to said Y-axis drive pulley so as to rotate the Y-axis drive pulley when it is rotated, the rotary shaft of said X-axis control knob extending through said Y-axis control knob; and Y-axis belt holding means for selectively coupling and releasing said Y-axis belt to and from said fixed plate such that when said Y-axis belt is coupled by the Y-axis belt holding means to the fixed plate, rotating the Y-axis control knob causes the Y-axis drive pulley to translate along said one side of the Y-axis belt in the Y direction.

17. A microscope comprising:

at least one ocular lens through which an object under examination is to be viewed;

at least one objective lens for magnifying an image of the object;

a stage disposed beneath said at least one objective lens, said stage comprising a Y-axis moving plate movable in a Y direction, and an X-axis moving plate movable in the Y direction and in an X direction perpendicular to the Y direction, said X-axis moving plate being slidably fitted to said Y-axis moving plate so as to be carried by the Y-axis moving plate when the Y-axis moving plate moves in the Y direction, and so as to be guided by the Y-axis moving plate for movement relative thereto in the X direction;

an object holder mounted on said X-axis moving plate so as to move therewith;

a fixed plate supporting the Y-axis moving plate, said Y-axis moving plate being slidably fitted to the fixed plate so as to be guided by the fixed plate for movement in the Y direction;

an X-axis driven pulley supported by said Y-axis moving plate so as to be freely rotatable, and an X-axis drive pulley supported by said Y-axis moving plate so as to be freely rotatable and spaced from the X-axis driven pulley in the X direction;

an X-axis belt wrapped around said X-axis drive pulley and said X-axis driven pulley so as to transmit rotation of said X-axis drive pulley to said X-axis driven pulley;

an X-axis control knob having a rotary shaft supported by said Y-axis moving plate so as to be freely rotatable and connected to said X-axis drive pulley so as to rotate the X-axis drive pulley when the X-axis control knob is rotated;

X-axis belt holding means for selectively coupling and releasing said X-axis belt to and from said X-axis moving plate;

two Y-axis driven pulleys supported by said fixed plate so as to be freely rotatable and spaced apart in the Y direction;

a Y-axis belt being wrapped around the Y-axis driven pulleys;

a Y-axis drive pulley supported by said Y-axis moving plate so as to be freely rotatable and tangentially contacting one side of the Y-axis belt;

a Y-axis control knob connected to said Y-axis drive pulley so as to rotate the Y-axis drive pulley when it is rotated, the rotary shaft of said X-axis control knob extending through said Y-axis control knob; and Y-axis belt holding means for selectively coupling and releasing said Y-axis belt to and from said fixed plate such that when said Y-axis belt is coupled by the Y-axis belt holding means to the fixed plate, rotating the Y-axis control knob causes the Y-axis drive pulley to translate along said one side of the Y-axis belt in the Y direction.

18. The microscope of claim 17, and further comprising a joystick comprising a handle which can be gripped and manipulated by an operator to move said X-axis moving plate and said Y-axis moving plate directly by hand, and a trigger movably mounted to said handle, said trigger being operatively connected to said X-belt holding means and to said Y-belt holding means in such a manner that when said trigger is operated, said X-axis belt holding means releases the X-axis belt from said X-axis moving plate and said Y-axis belt holding means releases said Y-axis belt from said fixed plate.

19. The microscope of claim 17, wherein said object holder is a vacuum chuck, and is mounted to said X-axis moving plate so as to be rotatable relative thereto in a horizontal plane.

* * * * *